United States Patent [19]

Dian

[11] 4,051,738
[45] Oct. 4, 1977

[54] SINGLE POINT RESILIENT AND ADJUSTABLE MOUNT FOR DERAILLER

[75] Inventor: Walter Dian, Downers Grove, Ill.

[73] Assignee: Beatrice Foods Co., Elgin, Ill.

[21] Appl. No.: 702,590

[22] Filed: July 6, 1976

[51] Int. Cl.² .............................................. F16H 7/22
[52] U.S. Cl. .................................... 74/217 B; 74/242
[58] Field of Search ............ 74/217 B, 242, 242.11 B, 74/242.15 B; 280/289

[56] References Cited

U.S. PATENT DOCUMENTS

| 2,564,576 | 8/1951 | Juy | 74/217 B |
| 3,702,080 | 11/1972 | Huret et al. | 74/217 B |
| 3,847,028 | 11/1974 | Bergles | 74/217 B |

FOREIGN PATENT DOCUMENTS 1,030,589  6/1953  France ................. 74/217 B

Primary Examiner—Samuel Scott
Assistant Examiner—Allan R. Burke
Attorney, Agent, or Firm—Hill, Gross, Simpson, Van Santen, Steadman, Chiara & Simpson

[57] ABSTRACT

A single point resilient and adjustable mount for a derailler which allows the rear derailler unit which supports and moves the roller cage to be flexibly and adjustably attached to the holding bracket attached to the axle and frame of the bicycle and which has a single adjustment for allowing the derailler unit to be angularly moved relative to the bracket so as to prevent bending of the bracket and derailler and easy and simple adjustment of the derailler.

10 Claims, 7 Drawing Figures

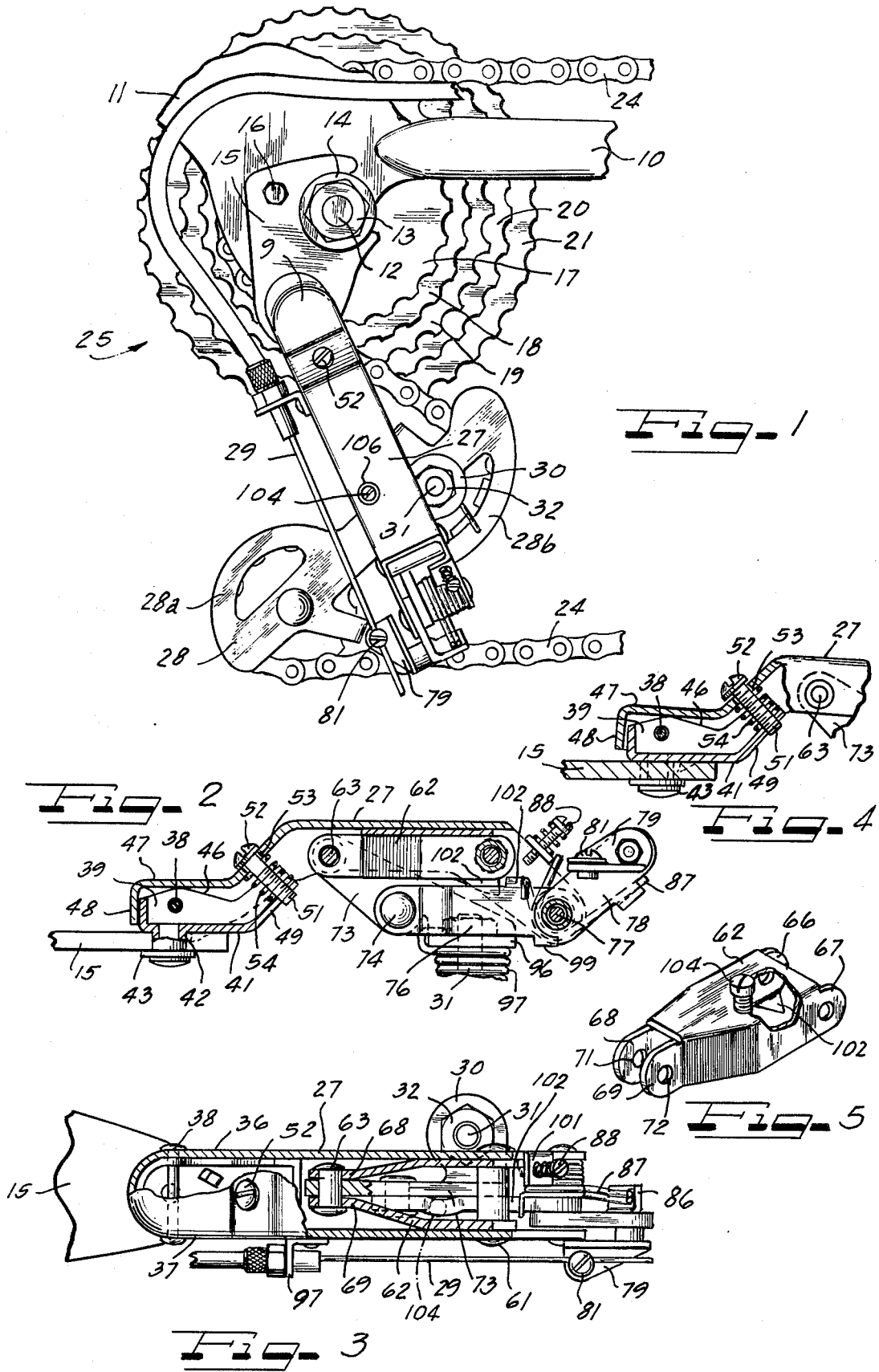

SINGLE POINT RESILIENT AND ADJUSTABLE MOUNT FOR DERAILLER

BACKGROUND OF THE INVENTION

1. Field of the Invention

This invention relates in general to deraillers and particularly to a single mount flexible adjustable rear derailler for a bicycle.

2. Description of the Prior Art

Rear derailler units support the roller cage for moving the chain between a number of rear sprockets so as to change the gear ratio of the bicycle. Prior art derailler units have been attached to a supporting bracket attached to the axle and frame of the bicycle and extend generally downwardly from the frame. It has been common for a bicycle to fall to the ground which has resulted in bending of the rear derailler and the bracket of the bicycle. Since the degree of adjustment of the derailler is within certain limits, it has been common for such falls to cause the bending of the bracket and/or the derailler such that the derailler cannot be adjusted to move the chain to all of the sprockets of the bicycle. Since the derailler extends a substantial distance from the support point on the bicycle frame, a substantial lever arm exists and when the bicycle falls over and engages the ground or other obstacle the bracket can be easily bent.

SUMMARY OF THE INVENTION

The present invention provides a novel single point resilient and adjustable mount for a rear derailler wherein the derailler unit is flexibly attached to the support bracket and is spring biased in a first direction so as to hold the derailler under normal conditions in a fixed angular position relative to the bracket. However, if the bicycle falls and/or if the derailler or bracket are subjected to a transverse bending force the derailler can move relative to the bracket so as to prevent bending of the bracket. Means are also provided for adjusting the angular position of the derailler relative to the bracket so that it can be moved outwardly or inwardly relative to the bicycle wheel to the desired position. The result is that the bracket and derailler unit will not be bent when the bicycle falls over and the derailler can be easily adjusted by the adjustment mechanism associated with the resilient one point support.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a partially cut-away plan view of the rear derailler unit of the invention;

FIG. 2 is a sectional view through the derailler unit;

FIG. 3 is a sectional view through the derailler unit;

FIG. 4 is a detailed view illustrating the derailler unit in a deflected position relative to the bracket;

FIG. 5 is a perspective view of the novel link of the derailler;

DESCRIPTION OF THE PREFERRED EMBODIMENTS

Figure 6:
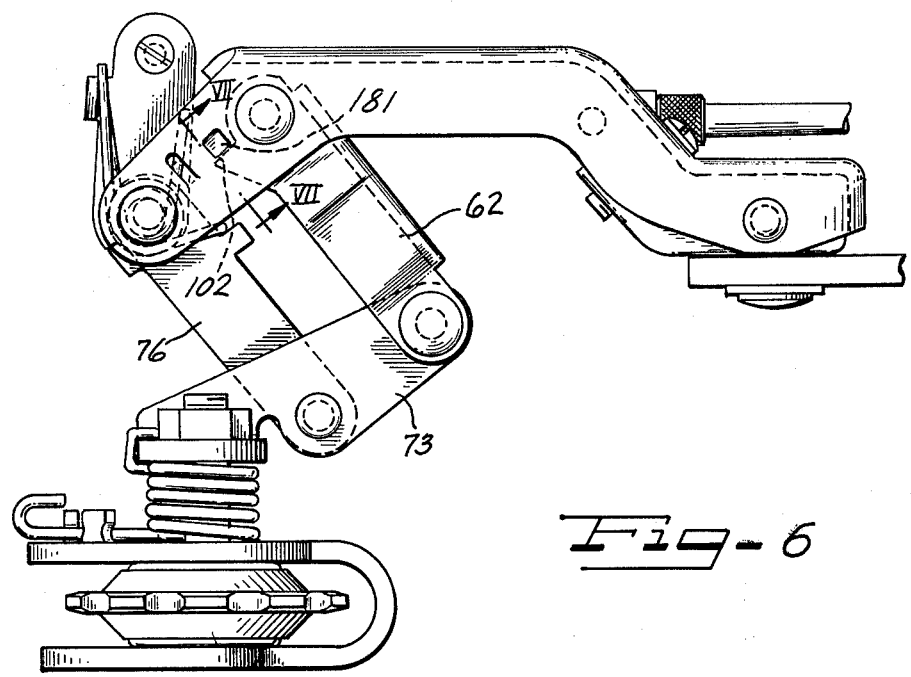
FIG. 6 is a side view of a modification.

FIG. 1 illustrates in partial cut-away a rear bicycle wheel 25 mounted to the bicycle frame 10 by an axle 12, a washer 14 and a nut 13 receivable on the threaded axle 12. A rear derailler mounting bracket 15 is of conventional type and has a slot receivable about the axle 12 and under the washer 14 and a bolt 16 receivable in the channel of the frame so as to prevent the bracket 15 from rotating relative to the frame. The rear derailler unit 27 is generally channel shaped and has sides 36 and 29 as shown in FIG. 3, and has its upper end 47 with a downwardly extending side 48 as best shown in FIG. 2 and FIG. 4. As shown in FIG. 2, the mounting bracket 15 has an opening through which a boss 42 of a coupling member 39 extends. A spring washer 43 is received in a groove on the boss 42 so as to lock the coupling member 39 to the supporting bracket 15. A pivot shaft 38 extends through the channel walls 29 and 36 of the derailler channel member 27 and through the coupling 39 as shown in FIG. 2, so that the derailler channel member 27 is pivotally attached to the coupling member 39. The coupling member 39 has a bottom portion 41 which engages the bracket 15 and has an outwardly extending portion 49 which is formed with a threaded opening through which a bolt 51 is threadedly received. A spring 54 is mounted about the bolt 51 between the portion 49 of the coupling member 39 and the inner wall of the derailler channel member 27 as shown in FIG. 2. An opening 53 is formed in the channel member and the head 52 of the bolt 51 is available externally of the channel member 27.

The opening 53 in the member 27 is small enough that the threaded portion of the bolt 51 can pass therethrough but the head of 52 of the bolt 51 cannot pass through the opening 53.

A roller cage 28 is supported from the derailler channel member 27 by means including a transverse shaft 61 which passes through openings 66 and 67 in a first link 62 shown in FIG. 5 which has its opposite ends spaced closer together than the portions 66 and 67 and formed with portions 68 and 69 with openings 71 and 72 through which a shaft 63 extends to pivotally support a link 73. The other end of link 73 is attached by pin 74 to a link 76 which is also pivotally supported to a portion of the channel member 27 by pivot pin 77 as shown in FIG. 2. The roller cage 28 is supported from the link 76 by means of a shaft 31 and spring 97 which are connected to a bracket 96 mounted on the link 76. The actuating cable 29 of the bicycle is attached to a supporting bracket 97 on the member 27 and engages and is attached by bolt 81 to an actuating link 78 which has one end supported on pivot pin 77 which passes through the member 27 and has its opposite end formed with a coupling member 79 upon which screw 81 is attached so as to lock the cable 29 to the member 79. A spring 87 is mounted between the link 78 and the link 76 and a stop 99 mounted on link 78 engages link 76 so as to limit in a first direction the angular movement between the links 78 and 76 but so as to allow flexible motion in the opposite direction. The spring 87 engages a projection 86 on the member 27 and its opposite end engages link 76.

The spring 87 and the links 78 and 76 are coupled in the fashion disclosed in U.S. Pat. No. 3,903,751, such that if the cable is moved to the left relative to FIGS. 2 and 3 so as to shift the roller cage at a time when the bicycle is not moving the link 78 can move relative to link 76 without breaking or stretching the cable. However, whenever the bicycle starts to move after such adjustment of the cable or if the bicycle is moving when the cable is adjusted shifting will immediately occur.

A limit screw 88 is threadedly received in a bracket 101 on member 27 and is engageable with a stop 102 on member 62 to adjust the limit of the outer position of the derailler. A second limit screw 104 has a head which is accessible through an opening 106 in the member 27 and passes through a bracket on member 27 and engages the link 76 to adjust the inward position of the derailler unit.

In operation, the bracket 15 and derailler member 27 are mounted on the bicycle axle and the nut 13 is tightened. The bolt 51 is adjusted by turning the head 52 such that the angular position between the member 27 and the coupling member 39 is as desired. It is to be realized that as the bolt 51 is tightened the head of the screw 52 engages the member 27 and pushes it clockwise relative to FIG. 2. Alternatively, as the bolt 51 is loosened, the head of the bolt 52 moves to the left relative to FIG. 2 allowing the member 27 to move counterclockwise due to the action of the spring 54. When the correct adjustment is made, the limit bolts 104 and 88 are adjusted to set the inner and outer limits of the derailler unit and the mechanism is ready for use. In the event the bicycle falls and the derailler member 27 engages the ground or other obstacle rather than applying a bending force to the bracket 15, the member 27 can move about the pivot shaft 38 as shown in FIG. 4, thus softening and reducing the bending torque applied to the bracket 15. After the impact has been made with the ground, the spring 54 will cause the member 27 to return to the initially adjusted position and the derailler will be in the original operating condition without the bracket or derailler unit having been bent. In prior art devices, when the bracket 15 has been bent and without the flexible coupling between a link 39 and the member 27 according to the invention, it has been necessary to remove the entire unit from the bicycle so as to re-straighten the bracket because when the bracket is bent it can prevent the derailler from being adjusted within its operating limits as the range of adjustment may not be such as to compensate for the bent bracket.

Figure 7:
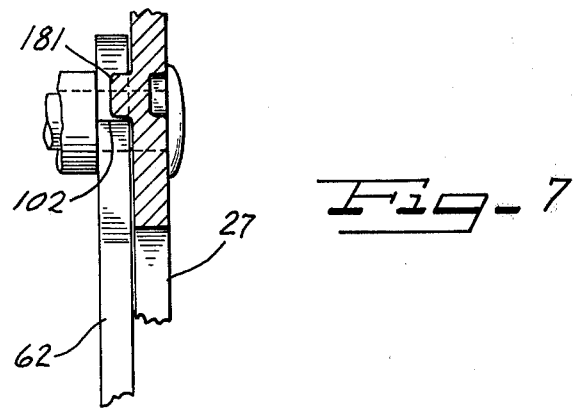
FIG. 7 is an enlarged detail view of the out stop.

FIGS. 6 and 7 illustrate an embodiment in which stop screws 88 and 104, opening 106 and bracket 101 are eliminated, and an extrusion 181 in the side of member 27 replaces the stop screw 88 and is placed in a proper position relative to stop 102, to provide an out limit. Thus is provided a predetermined excursion of the shifting mechanism to accommodate the distance required to shift through all gears, as well as the overtravel required to accommodate worn chain, gear, etc. The fully retracted position is limited by member 62 being seated in 27.

Since the majority of bicycles have fairly constant distance from rear drop out to the rear cluster and all five gear clusters have the same distance high gear to low gear, the real need for adjustment is to correct for the angular irregularities of the surface to which the derailler is mounted. So, if the single screw is adjusted to properly place the shifting mechanism relative to cluster gear, this also corrects for the angular drop out plate or wheel mount bracket which occurs in the production lines of bicycle manufacturers and truly a single screw adjustment is obtained.

It is seen that the present invention provides a novel single point resilient and adjustable mount for a rear derailler and although it has been described with respect to preferred embodiments, it should not be so limited as changes and modifications can be made therein which are within the full intended scope of the invention as defined by the appended claims.

I claim as my invention:

1. A rear derailler for a bicycle having a rear wheel attached to its frame, comprising a bracket attached to the frame of the bicycle adjacent the rear wheel, a derailler member movably attached to said bracket member and flexibly biased away from the plane of the rear wheel, such that upon the application of a force transverse to the plane of the rear wheel acting on said derailler member, the derailler member can move about said bracket and toward the rear wheel, so as to prevent damage to the derailler.

2. A rear derailler unit according to claim 1 including means for adjusting the outer angular position of said derailler member relative to said bracket.

3. A rear derailler according to claim 1 including a pivot shaft which extends through said bracket and said derailler member on an axis generally parallel to the plane of the rear wheel of the bicycle.

4. A rear derailler according to claim 3 including a bolt threadedly received in an opening in said bracket, and a spring mounted about said bolt and having one end engageable with said bracket and its other end engageable with said derailler member to bias it away from said rear wheel, and the head of said bolt engageable with said derailler member to establish a limiting position of said derailler member relative to said bracket.

5. A rear derailler member according to claim 4 wherein said derailler member is formed with an opening and the head of said bolt mounted on said derailler member on a first side and said spring mounted about said bolt on the second side thereof to bias the derailler member away from said bracket.

6. A rear derailler according to claim 5 wherein said derailler member is channel-shaped.

7. A rear derailler according to claim 6 wherein said bracket is formed of a first planar member attached to the bicycle and a channel shaped coupling member through which said pivot shaft extends to support said derailler member.

8. A rear derailler according to claim 7 wherein said channel-shaped coupling member fits within said channel shaped derailler member.

9. A rear derailler according to claim 8 wherein said channel-shaped derailler member is formed with an outwardly bent portion and said bolt extending through said outwardly bent portion.

10. A rear derailler according to claim 9 wherein said coupling member has outer curved edges adjacent said derailler member.

* * * * *